United States Patent
Burton et al.

(10) Patent No.: US 9,263,918 B2
(45) Date of Patent: Feb. 16, 2016

(54) CONNECTION FOR MOTOR STATOR SEGMENTS

(71) Applicant: Nidec Motor Corporation, St. Louis, MO (US)

(72) Inventors: Stephen J. Burton, Fenton, MO (US); Gary E. Horst, Manchester, MO (US)

(73) Assignee: Nidec Motor Corporation, St. Louis, MO (US)

( * ) Notice: Subject to any disclaimer, the term of this patent is extended or adjusted under 35 U.S.C. 154(b) by 453 days.

(21) Appl. No.: 13/673,781

(22) Filed: Nov. 9, 2012

(65) Prior Publication Data

US 2014/0132110 A1     May 15, 2014

(51) Int. Cl.
| | |
|---|---|
| *H02K 1/18* | (2006.01) |
| *H02K 1/14* | (2006.01) |
| *H02K 5/128* | (2006.01) |
| *H02K 7/14* | (2006.01) |
| *F04D 13/06* | (2006.01) |

(52) U.S. Cl.
CPC ............... *H02K 1/18* (2013.01); *F04D 13/064* (2013.01); *H02K 1/143* (2013.01); *H02K 5/128* (2013.01); *H02K 7/14* (2013.01)

(58) Field of Classification Search
CPC ....... H02K 1/141; H02K 1/143; H02K 1/185; H02K 3/524; H02K 21/18; H02K 21/185; H01F 27/63; H01F 27/263
USPC .................................. 310/216.021–216.039, 310/216.131–216.135; 336/216, 217
See application file for complete search history.

(56) References Cited

U.S. PATENT DOCUMENTS

| | | | | |
|---|---|---|---|---|
| 2,294,322 | A * | 8/1942 | Van Der Woude ............ | 336/210 |
| 2,355,175 | A * | 8/1944 | Olving ................... | 310/216.102 |
| 5,927,249 | A * | 7/1999 | Ackermann et al. .......... | 123/399 |
| 2004/0183644 | A1 * | 9/2004 | Fishbein ...................... | 336/234 |
| 2007/0241629 | A1 * | 10/2007 | Ionel et al. .................... | 310/214 |
| 2008/0036310 | A1 * | 2/2008 | Marioni .......................... | 310/41 |
| 2008/0303369 | A1 * | 12/2008 | Ionel et al. .................... | 310/172 |
| 2009/0001824 | A1 * | 1/2009 | Marioni .......................... | 310/42 |

* cited by examiner

*Primary Examiner* — Quyen Leung
*Assistant Examiner* — Eric Johnson
(74) *Attorney, Agent, or Firm* — Hovey Williams LLP

(57) ABSTRACT

A motor is provided for use in a machine. The motor includes a segmented stator and a resiliently flexible clip. The stator includes a core having spaced apart arms and a yoke. The arms define an opening therebetween, and the yoke spans the opening. The clip is removably retained on the core so as to apply pressure against each arm toward the yoke such that the arms are retained in contact with the yoke.

30 Claims, 9 Drawing Sheets

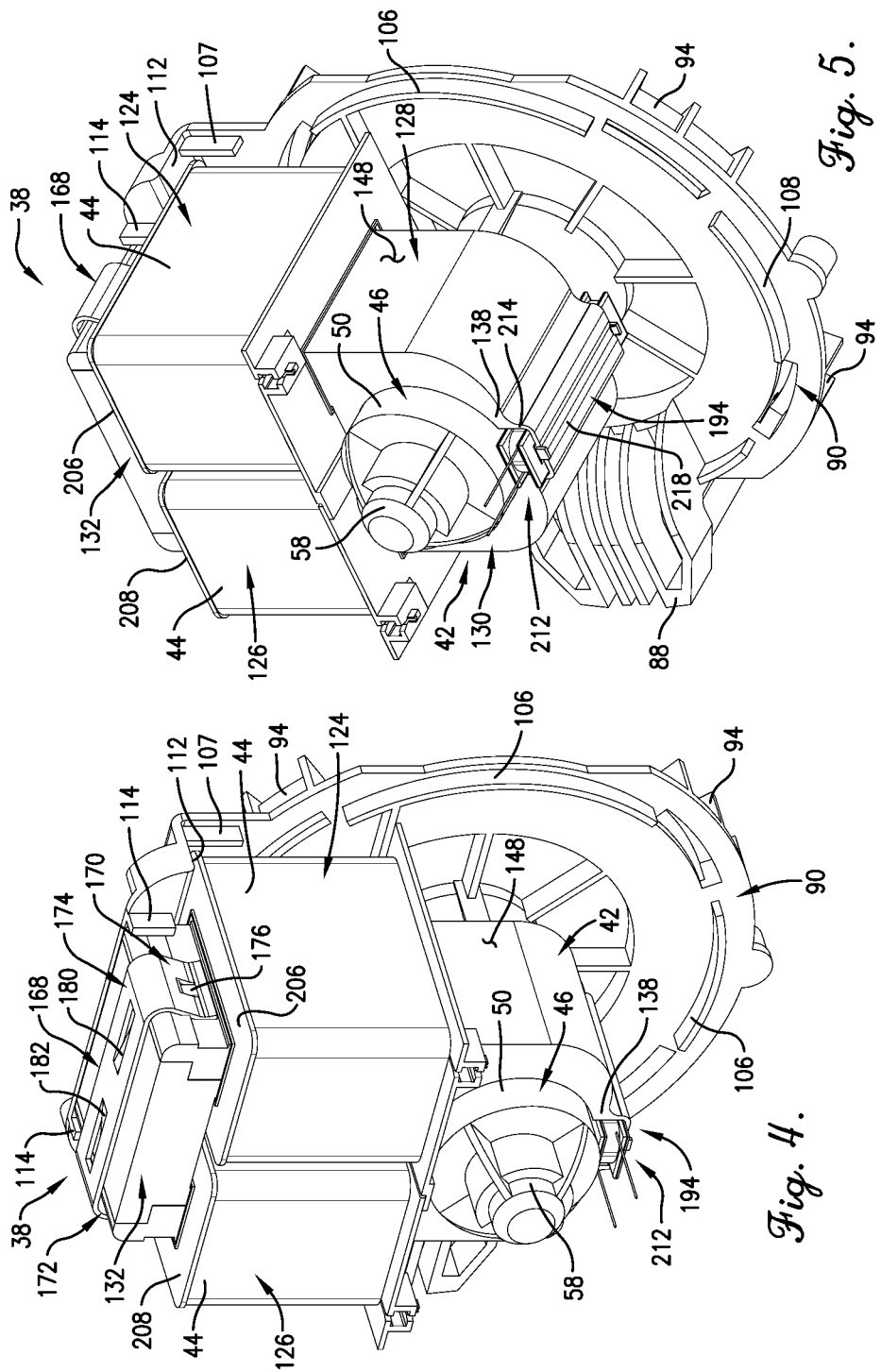

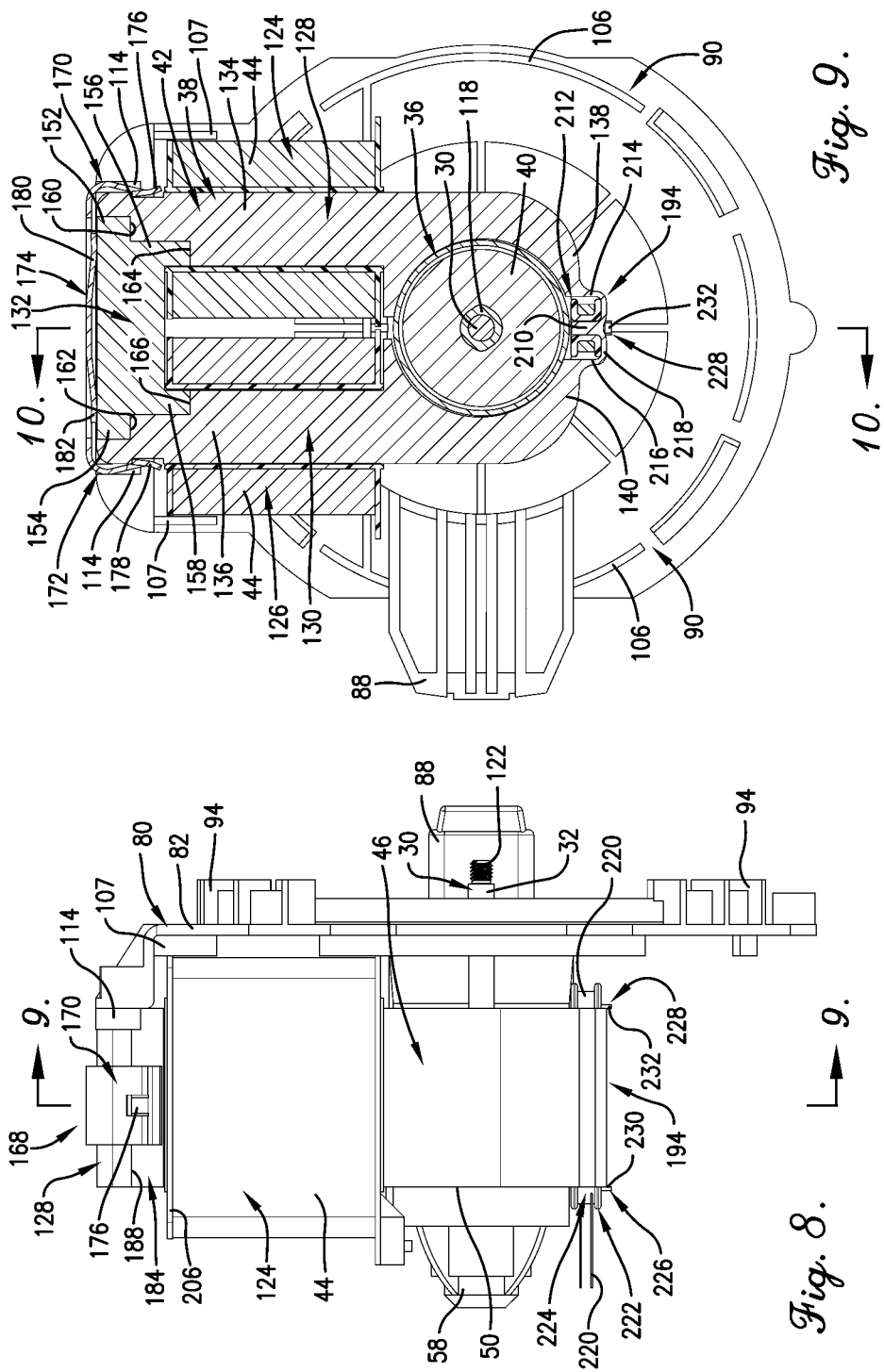

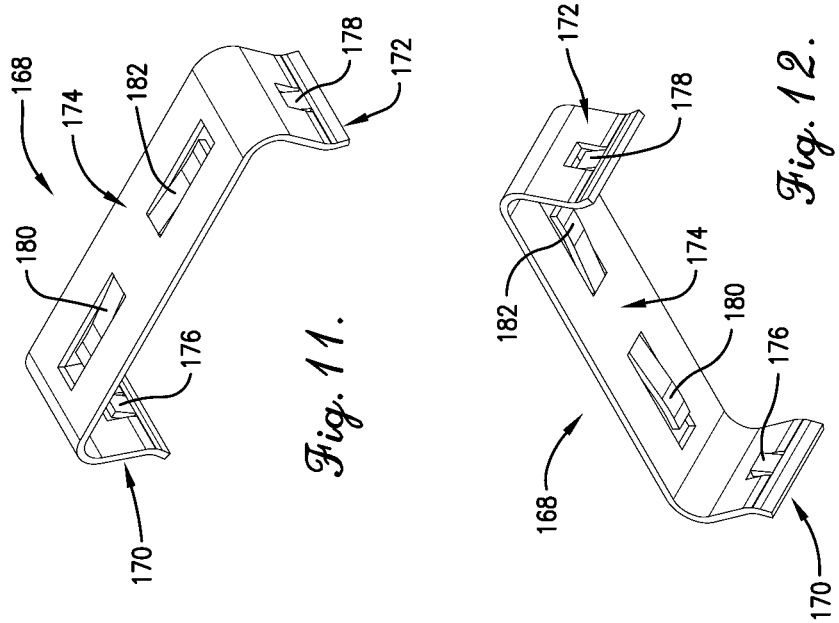
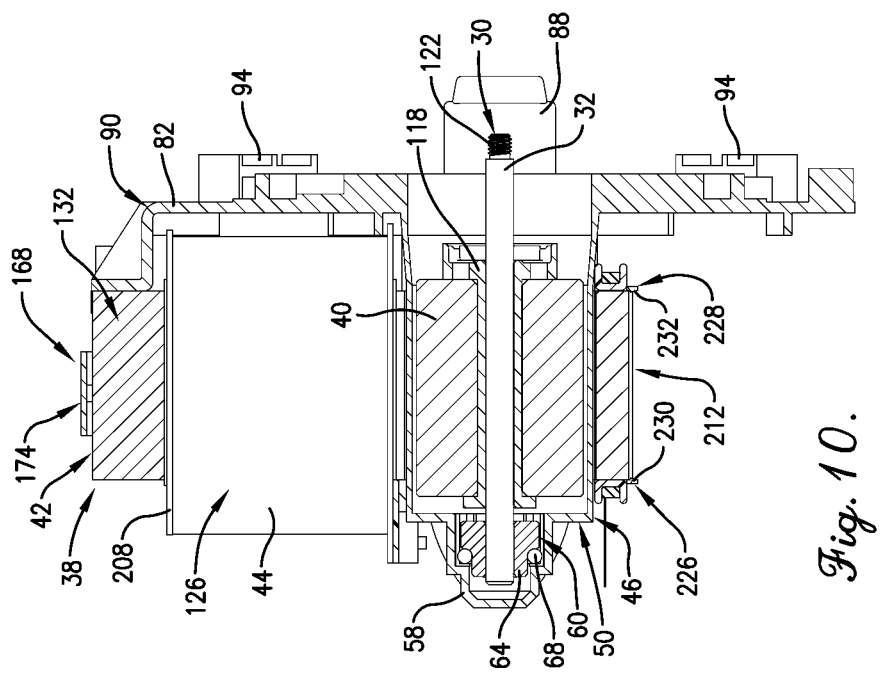

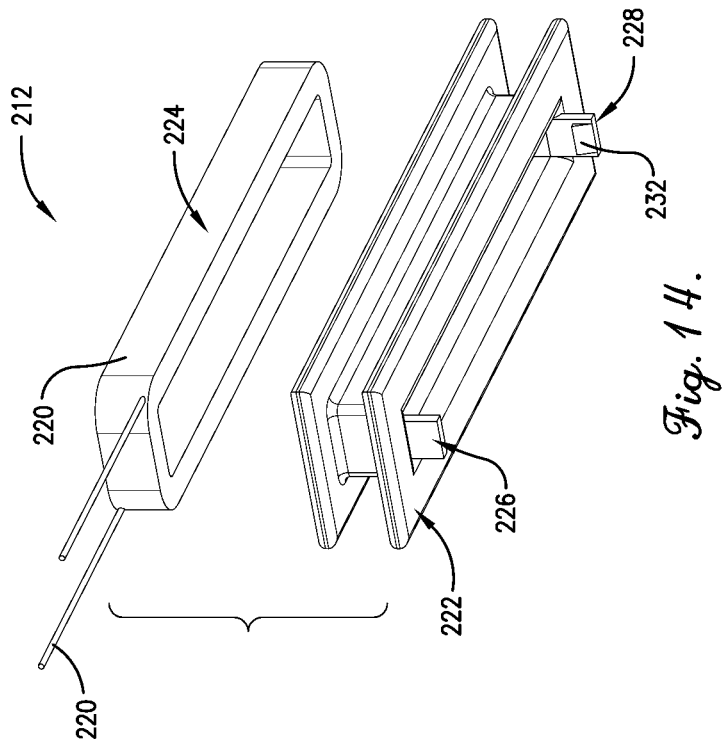
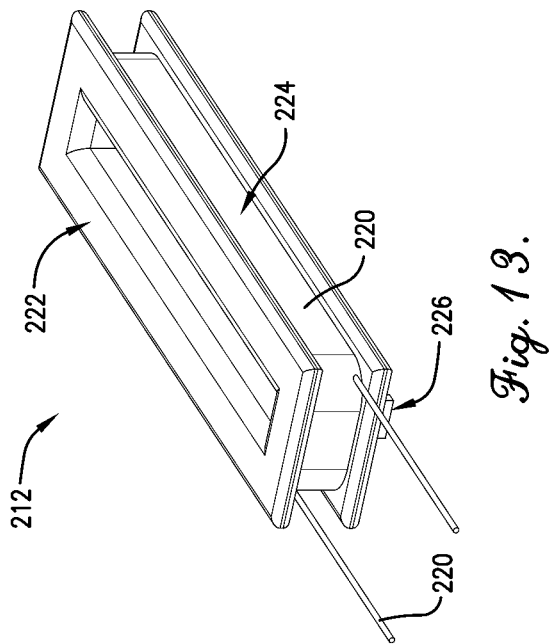

CONNECTION FOR MOTOR STATOR SEGMENTS

BACKGROUND OF THE INVENTION

1. Field of the Invention

The present invention relates generally to an electric motor for use in a machine. More specifically, the present invention concerns an electric motor including a stator with segments held together by a resiliently flexed clip.

2. Discussion of the Prior Art

Those of ordinary skill in the art will appreciate that electric motors are often used in home appliances such as dishwashers and washing machines. In a dishwasher, for instance, a sump may be provided and drained by a pump that is driven by an electric motor.

Although a variety of motor component arrangements may be used, one known embodiment of an electric motor includes a stator including a pair of spaced apart arms defining an opening therebetween. Wiring is wound around the arms, and a rotor is positioned at least in part within the opening defined by the arms. It is common for the stator in such motors to have a generally C-shaped core. Such a motor is typically a single phase, two-pole motor.

SUMMARY

According to one aspect of the present invention, a stator is provided for use in a motor. The stator includes a core including a pair of spaced apart arms that define an opening and a removable yoke that spans the opening, wiring wound around at least one of the arms, and a resiliently flexible clip removably retained on the core. The clip is resiliently flexed when retained on the core so as to apply pressure against each arm toward the yoke such that the arms are retained in contact with the yoke.

According to another aspect of the present invention, a motor is provided for use in a machine. The motor includes a rotor rotatable about an axis and a stator. The stator includes a core including a pair of spaced apart arms and a removable yoke. The arms define an opening, and the yoke spans the opening. Wiring is wound around at least one of the arms, and a resiliently flexible clip is removably retained on the core. The clip is resiliently flexed when retained on the core so as to apply pressure against each arm toward the yoke such that the arms are retained in contact with the yoke.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 4 is a top rear perspective view of a portion of the motor of FIG. 3, with the stator housing removed;

FIG. 5 is a bottom rear perspective view of the portion of the motor of FIG. 4;

FIG. 8 is a side view of the motor of FIGS. 3-5;

FIG. 9 is a cross-sectional view of the motor taken along line 9-9 of FIG. 8;

FIG. 10 is a cross-sectional view of the motor taken along line 10-10 of FIG. 9;

FIG. 11 is a top perspective view of a stator clip of FIGS. 1-10;

FIG. 12 is bottom perspective view of the stator clip of FIG. 11;

FIG. 13 is top perspective view of the search coil of FIGS. 4-10; and

FIG. 14 is an exploded bottom perspective view of the search coil of FIG. 13.

Figure 1:
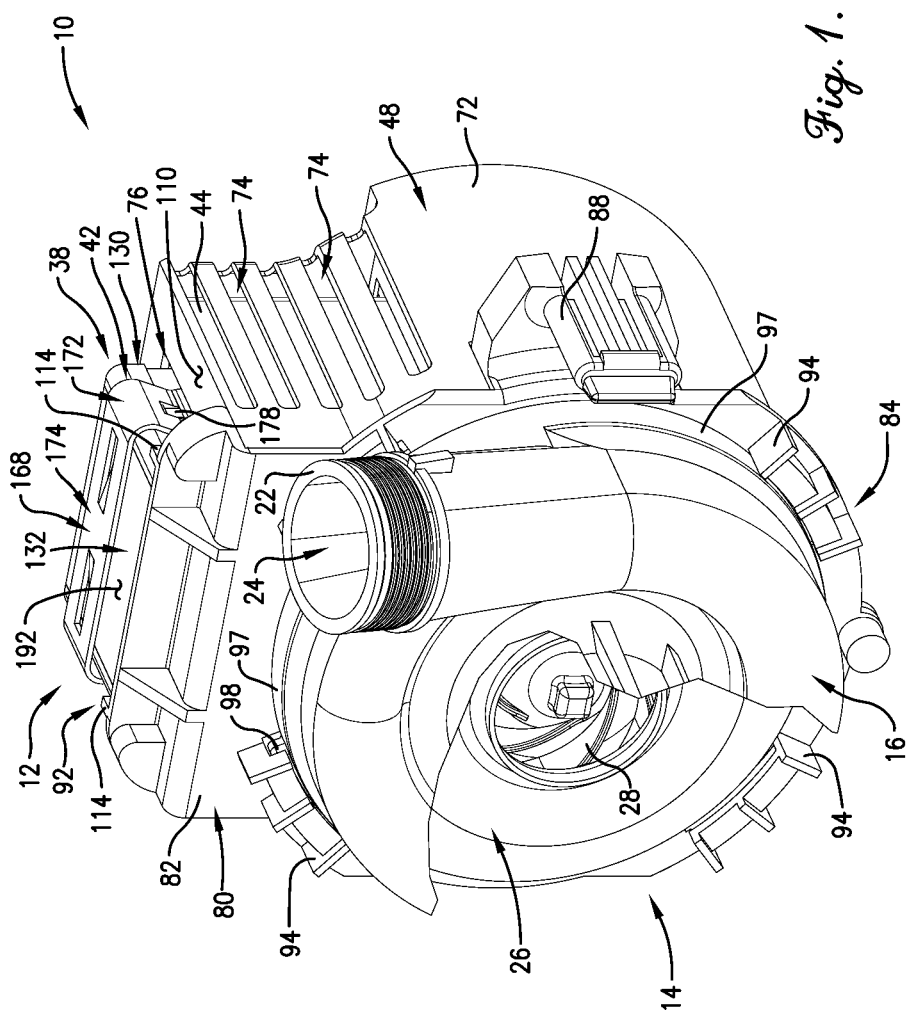
FIG. 1 is a fragmented front perspective view of an electric pump constructed in accordance with the principles of a first embodiment of the present invention.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 2:
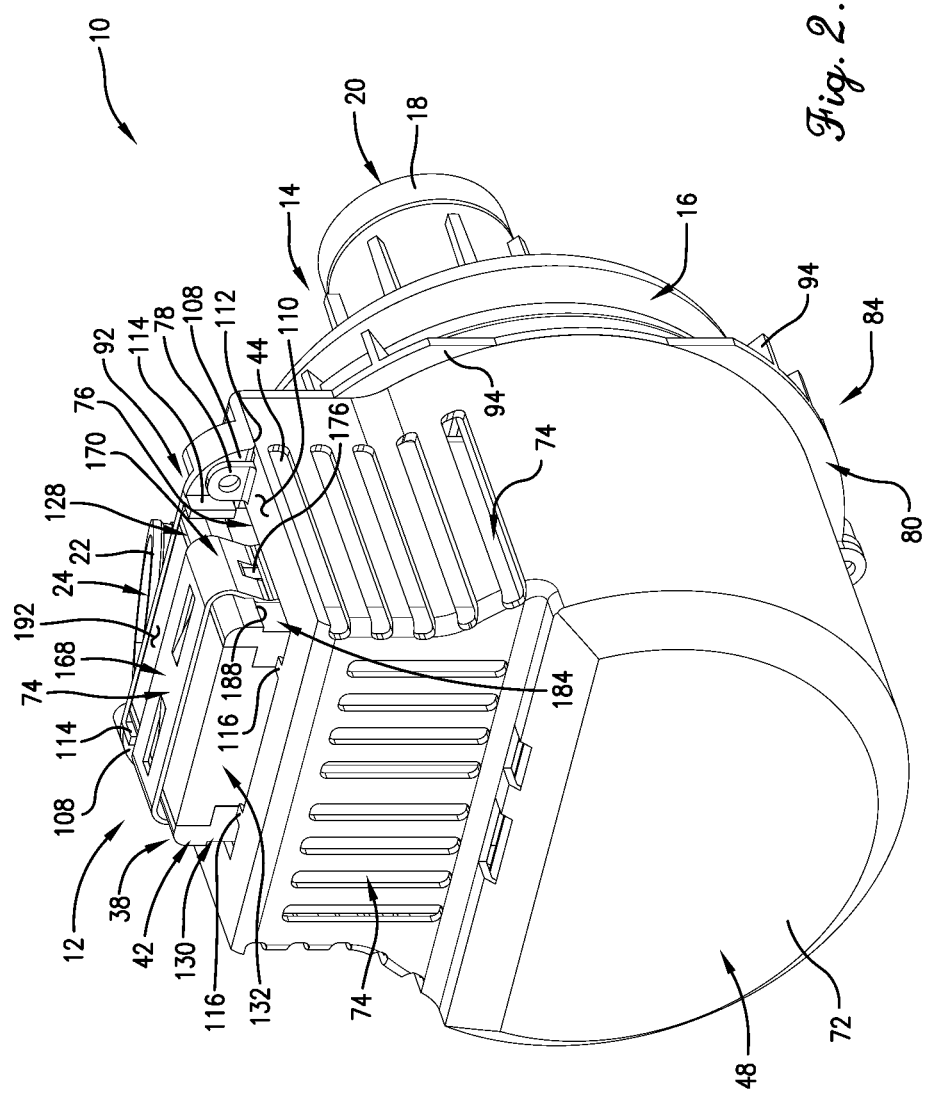
FIG. 2 is a rear perspective view of the electric pump of FIG. 1.

With initial reference to FIGS. 1 and 2, an electric pump assembly 10 constructed in accordance with a first preferred embodiment of the present invention is depicted for use in a machine. The machine may suitably be any one of a variety of types, including but not limited to dishwashers. The pump assembly 10 preferably includes a motor 12 and a pump 14.

Although the motor 12 is discussed herein in the context of the pump assembly 10 and in relation to the pump 14, it is to be understood that the motor 12 may suitably be used in applications not associated with pumps or in pump applications varying from the preferred pump application described herein.

The pump 14 preferably includes a pump housing 16 having an inlet 18 defining a channel 20 and an outlet 22 defining a channel 24. The inlet channel 20 is preferably orthogonal to the outlet channel 24, although the relative orientation of the channels may vary without departing from the scope of the present invention.

As best shown in FIG. 1, the pump housing 16 also preferably in part defines a pump chamber 26 that houses a rotatable impeller 28. The impeller 28 is preferably mounted on a rotatable shaft 30 (best shown in FIGS. 3 and 10) having a forward machine connection end 32 and a rearward end 34.

In a preferred mode of operation, rotation of the impeller 28 draws fluid into the pump chamber 26 through the inlet 18 and propels it out of the pump chamber 26 through the outlet 22. The fluid may be either a liquid or a gas.

The motor 12 is preferably a single phase motor and preferably includes a rotor 36 and a stator 38. As will be discussed in greater detail below, the rotor 36 preferably includes the rotatable shaft 30 and a magnet 40. Among other things, the stator 38 preferably includes a core 42 and wire 44 wound about the core 42. The rotor 36 is substantially housed within a rotor housing 46, and the stator 38 is substantially housed within a stator housing 48.

Figure 3:
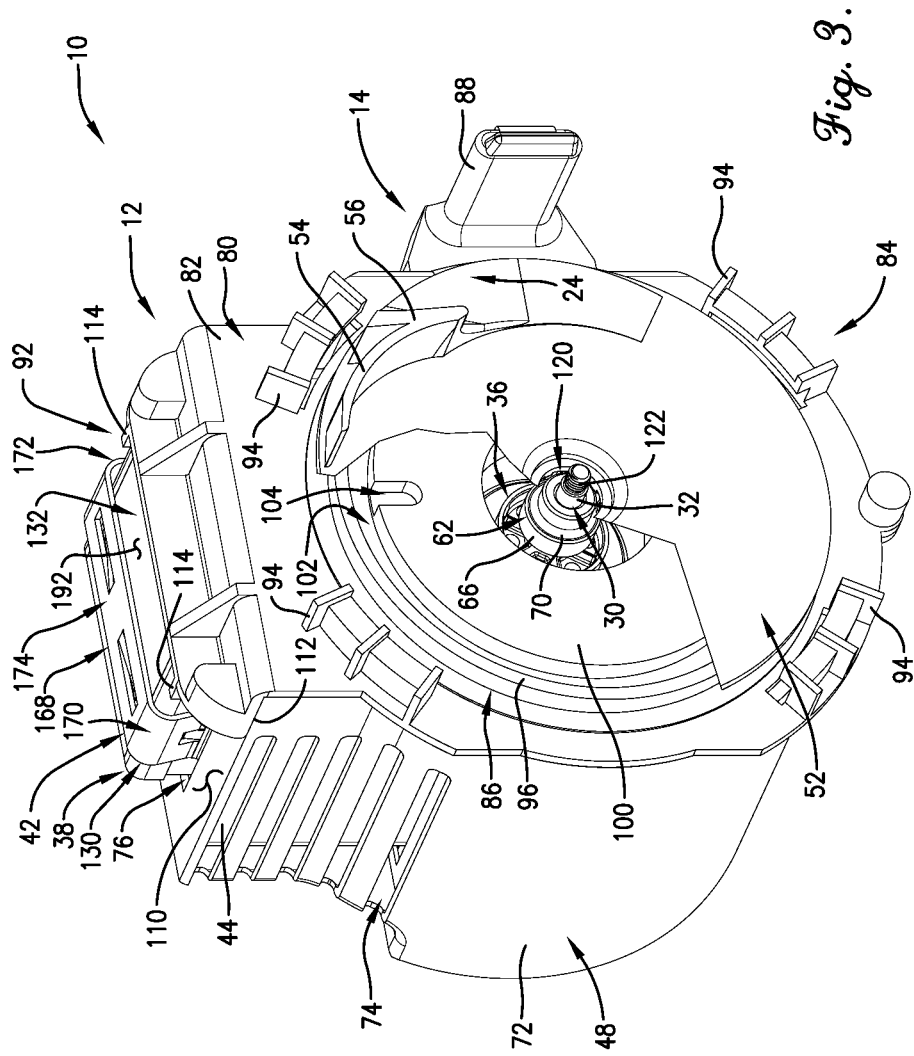
FIG. 3 is a fragmented front perspective view of the motor of the electric pump of FIGS. 1 and 2.
Figure 6:
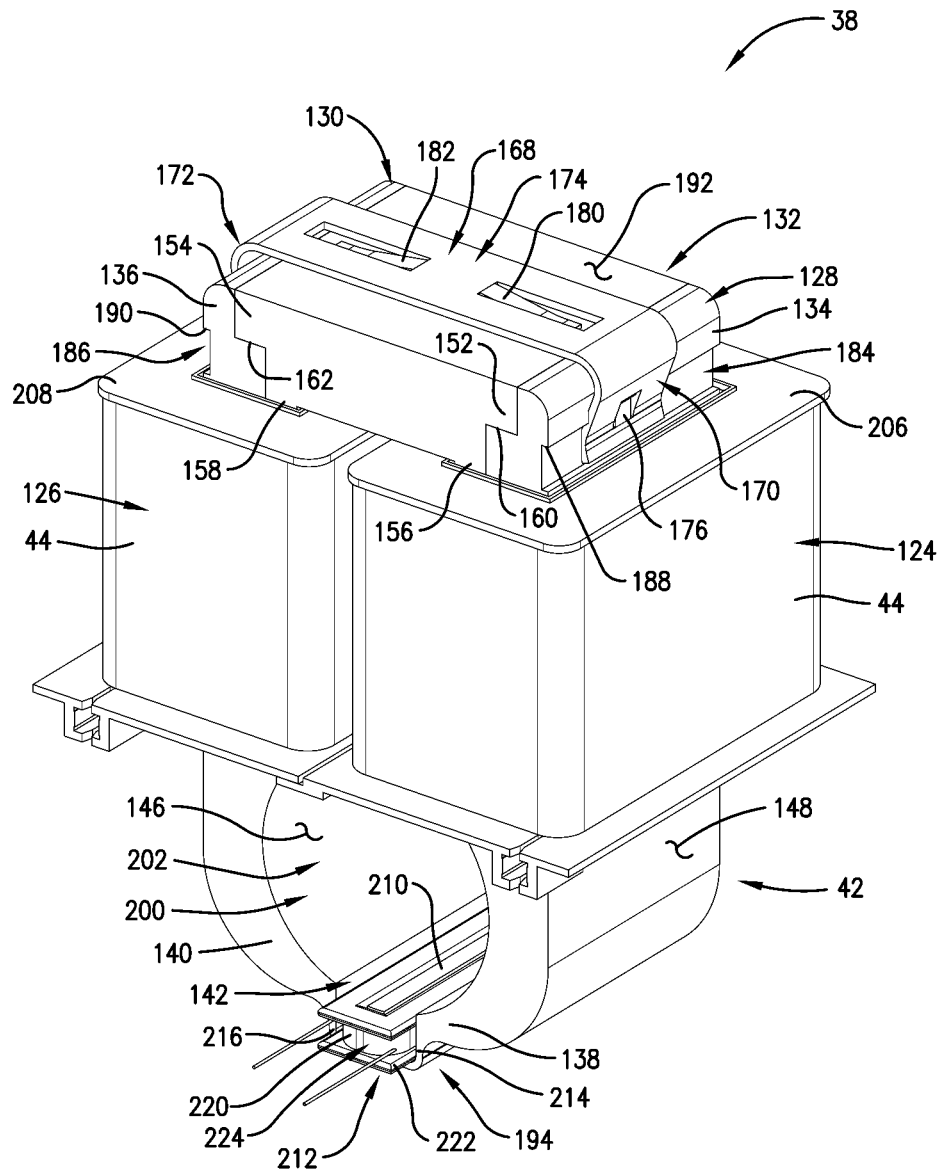
FIG. 6 is a rear perspective view of the stator and search coil of the motor of FIGS. 3-5.
Figure 7:
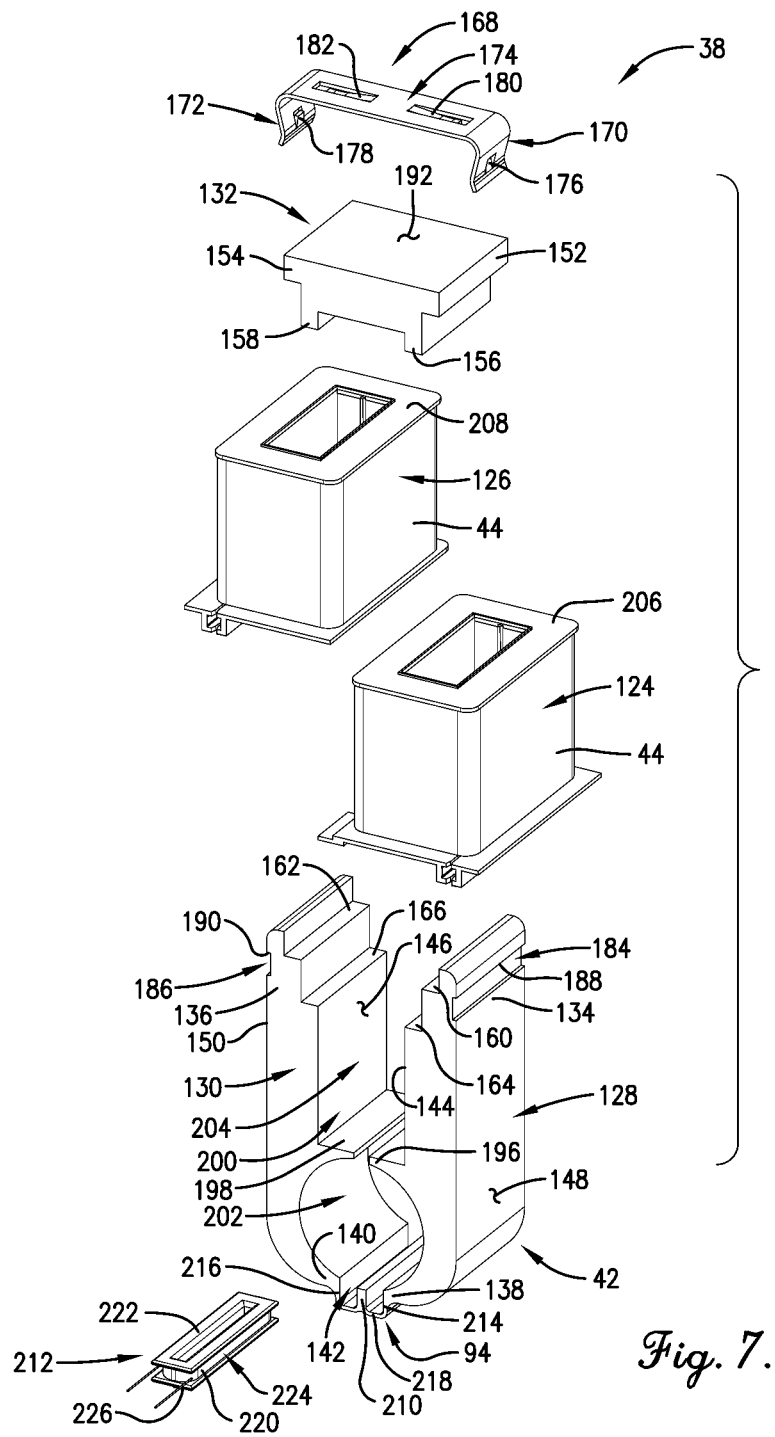
FIG. 7 is an exploded perspective view of the stator and search coil of FIG. 6.

In a preferred embodiment, the rotor housing 46 includes a capsule 50 and an end cap 52 (best shown in FIG. 3). The end cap 52 preferably also cooperates with the pump housing 16 to define the pump chamber 26. Furthermore, in a preferred embodiment, the end cap 52 includes flow directors 54 and 56, wherein flow director 54 directs fluid from the impeller 28 in a circumferential direction and flow director 56 at least in part defines the pump outlet 22 and thus directs fluid from the impeller 28 therethrough.

The rotor capsule 50 preferably at least partially encompasses the rotor 36. As best shown in FIGS. 4, 5, 8, and 10, the capsule 50 is preferably substantially cylindrical and is closed at its rearward end 34 so as to prevent passage of fluids or particulate into or out of the capsule 50 through the rearward end 34.

In a preferred embodiment, the capsule 50 includes a tapered region 58. As shown in FIG. 10, the rotor shaft 30 is preferably rotatably supported at its rearward end 34 by a first bearing assembly 60 configured to fit securely in the tapered region 58 of the rotor capsule 50. As shown in FIG. 3, the rotor shaft 30 is preferably supported at its forward end 32 by a second bearing assembly 62. The bearing assemblies 60 and 62 ensure that rotation of the rotor 36 is isolated from the rotor capsule 50. In a preferred embodiment, each of the bearing assemblies 60 and 62 includes a respective bushing 64 or 66 and an O-ring 68 or 70. However, any one or more of a variety of different rotation isolation mechanisms may be used to similar effect without departing from the spirit of the present invention.

The O-rings 68 and 70 preferably keep the rotor capsule 50 "dry" (i.e., isolated from the fluid pumped by the pump) and hold the bushings 64 and 66 stationary relative to the rotor housing 46. However, if desired, the O-rings 68 and 70 may be alternatively configured or removed altogether. For example, the motor may be alternatively designed so that the rotor capsule 50 is "wet" (i.e., filled with the fluid pumped by the pump).

Furthermore, although provision of a substantially cylindrical rotor capsule 50 including a tapered region 58 for support of the bearing assembly 60 is preferred, any one of a variety of capsule shapes may be utilized without departing from the scope of the present invention.

Although use of any or one or more of a variety of materials falls within the scope of the present invention, the rotor housing 46 is preferably formed of plastic.

In a preferred embodiment, the stator housing 48 includes a cover 72 in which a plurality of ventilation slots 74 are formed for cooling of the stator 38 during and after operation of the motor 12. An aperture 76 is preferably formed in the top of the cover 72 to allow projection of a portion of the stator 38 therethrough. A pair of positioning tabs 78, one of which is shown in FIG. 2, preferably extend generally upwardly from the cover 72.

Although use of any or one or more of a variety of materials falls within the scope of the present invention, the stator housing 48 is preferably formed of plastic.

An intermediate plate 80 preferably interconnects the pump housing 16, the stator housing 48, and the rotor housing 46. In a preferred embodiment, the intermediate plate 80 includes a base wall 82. Pump housing connection structure 84, rotor housing connection structure 86, and an electrical connector element 88 preferably project forward from the base wall 82. The intermediate plate 80 further preferably includes stator housing connection structure 90 and stator positioning structure 92 projecting backward from the base wall 82.

Although use of any or one or more of a variety of materials falls within the scope of the present invention, the intermediate plate 80 is preferably formed of plastic.

As best shown in FIG. 3, the pump housing connection structure 84 preferably includes a plurality of arcuately spaced apart holders 94 and an elevated ring 96. As best shown in FIG. 1, the pump housing 16 preferably includes an outer wall 97 and a plurality of flanges 98 (one shown) that extend radially outwardly from the wall 97. The flanges 98 preferably correspond to the holders 94 and are configured for sliding engagement with the respective holders 94 when the pump housing 16 is mounted on or connected to the intermediate plate 80. The holders 94 are preferably configured to at least partially restrict both rotational and axial motion of the pump housing 16. Furthermore, the outer wall 97 is configured to circumscribe the elevated ring 96 when the pump housing 16 and the intermediate plate 80 are connected. Although the above-described connection configuration is preferred, it is to be understood that any suitable connection mechanism may be used. For instance, screws, adhesives, welds, splines and grooves, latches, and/or other devices or techniques might be used to effect the desired connection.

The rotor housing connecting structure 86 preferably includes the elevated ring 96 (which is thus preferably part of both the pump housing connection structure 84 and the rotor housing connection structure 86) and a central platform 100, wherein an annular groove 102 is formed between the elevated ring 96 and the central platform 100. A positioning notch 104 is preferably formed in the platform 100. The ring 96, the platform 218, the groove 102, and the notch 104 preferably correspond to structure on the end cap 52. More particularly, the end cap 52 preferably includes an annular projection (not shown) and a positioning projection (not shown) configured to be received in the annular groove 102 and the positioning notch 104, respectively, such that the end cap 52 is secured on the front of the intermediate plate 80.

The other component of the rotor housing 46, the rotor capsule 50, is preferably integral with the intermediate plate 80 and extends therefrom. Separate connection structure is therefore not necessary for the rotor capsule 50 in the preferred embodiment. However it is within the scope of the present invention for connection structure to be provided for attachment of a non-integral rotor capsule to the intermediate plate. Furthermore, any connection structure provided may be integral with the rotor capsule and/or the end plate, rather than with the intermediate plate.

In general, it is to be understood that any suitable connection mechanism may be used for connection of the end cap 52 and/or the capsule 50 to the intermediate plate 80. For instance, screws, adhesives, welds, splines and grooves, latches, and/or other devices or techniques might be used to effect the desired connection.

As best shown in FIGS. 4 and 5, the stator housing connection structure 90 preferably includes a plurality of arcuate retaining walls 106 and vertical retaining walls 107 for engagement with corresponding structure (not shown) of the stator housing 48. However, any suitable structure for connecting the stator housing 48 to the intermediate plate 80 is permissible within the scope of the present invention. A plurality of catches might be provided, for instance, or adhesives might be used.

Positioning of the stator housing 48 is facilitated by engagement of the previously described positioning tabs 78 with a corresponding pair of vertical surfaces 108 of the intermediate plate. Positioning is also facilitated by means of engagement of an upper surface 110 of the stator housing 48 with a pair of shoulders 112 formed by the intermediate plate 80.

The stator positioning structure 92 preferably includes a pair of spaced apart side retention tabs 114 extending from the intermediate plate 80 and a pair of ridges 116 extending from the stator housing 48. The spacing of the retention tabs 114 preferably corresponds to the width of the stator 38 to be positioned between the tabs 114. In a preferred embodiment, the retention tabs 114 restrict lateral movement of the stator 38, while the ridges 116 restrict rearward movement of the stator 38. The intermediate plate 80 in general also acts to position the stator 38 by restricting forward movement of the stator 38.

As noted previously, the rotor 36 preferably includes a magnet 40 and a rotatable shaft 30. As shown in FIG. 10, the magnet 40 is preferably supported on the shaft 30 by a sleeve 118. Preferably, the magnet 40 is a single permanent multi-pole magnet having a cylindrical form. However, use of multiple magnets or a differently shaped multi-pole magnet is permissible provided a suitable pole-slot ratio and configuration is achieved.

As best shown in FIG. 3, the end cap 52 preferably includes an opening 120 extending therethrough. The forward or machine connection end 32 of the shaft 30 preferably extends through the opening 120 and is supported in the opening 120 by the previously-described bearing assembly 62. The opening 120 is preferably made fluid-tight by the O-ring 70 of the bearing assembly 62. Thus, the rotor housing 46 is preferably sealed at its forward end against either encroachment or outflow of fluids or particulate material, although a "wet" rotor design is within the ambit of the present invention, as previously described.

Again, the machine connection end 32 of the shaft 30 preferably extends through the opening 120 of the end cap 52 so as to be positioned outside of the rotor housing 146. The end 32 preferably includes a plurality of threads 122 onto which the impeller 28 of the pump 14 may be threaded in such a manner that rotation of the shaft 30 is transferred to the impeller 28. Rotation of the shaft 30 thereby leads to operation of the pump 14.

Preferably, the axis of rotation of the rotor 36 is coaxial with that of the rotatable shaft 30 and of the impeller 28. It is permissible, however, for offset axes to be defined. It is also permissible for any one or more of a variety of connection means to be used to fix the impeller to the shaft.

As noted above, among other things, the stator 38 preferably includes a core 42 and wire 44. The wire 44 is wound around the core 42 to form pluralities of coils 124 and 126.

The core 42 preferably includes a pair of spaced apart arms 128 and 130 and a yoke 132. The arms 128 and 130 are preferably substantially parallel and extend along a common direction. Furthermore, the arms 128 and 130 each preferably include a respective base 134 or 136 and a respective tip 138 or 140, wherein the tips 138 and 140 define a gap 142 therebetween. Even further, each arm 128 or 130 preferably defines a respective inner surface 144 or 146 and a respective outer surface 148 or 150.

The yoke 132 preferably extends between and interconnects the arms 128 and 130 adjacent the bases 134 and 136, such that the core 42 is substantially C-shaped in form. A variety of core shapes are permissible without departing from the scope of some aspects of the present invention, however. For instance, according to some aspects of the present invention, the core might be generally toroidal and consist of a plurality of interconnected segments; or any one of more of the yoke and arms described above might consist of multiple discrete segments.

The yoke 132 is preferably removably retained between the arms 128 and 130. That is, the yoke 132 may be easily removed from the arms 128 and 130 and replaced between the arms 128 and 130 as required for assembly, disassembly, and/or operation of the pump assembly 10, as will be discussed in more detail below.

In a preferred embodiment, the yoke 132 includes a pair of laterally extending projections 152 and 154 and a pair of vertically extending projections 156 and 158, wherein the lateral projections 152 and 154 and the vertical projections 156 and 158 extend at least substantially orthogonally relative to each other. The arms 128 and 130 preferably include respective first shelves 160 and 162 configured to abut corresponding ones of the lateral projections 152 and 154, as well as respective second shelves 164 and 166 configured to abut corresponding ones of the vertical projections 156 and 158. The yoke 132 and the arms 128 and 130 are therefore configured to fit together in a substantially continuous manner.

In a preferred embodiment, a resiliently flexible clip 168 is removably retained on the core 42. The clip 168 preferably includes a pair of spaced apart legs 170 and 172 and a bight 174 extending between and interconnecting the legs 170 and 172 such that the clip 168 takes a generally U-shaped form. Each leg 170 and 172 preferably includes a respective catch 176 or 178, while the bight 174 preferably includes a pair of retention members 180 and 182 that preferably each comprise a flexibly deformable spring element. The clip 168 is preferably resiliently flexed when retained on the core 42 as to apply pressure against each arm 128 and 130 toward the yoke 132 so that the arms 128 and 130 are retained in contact with the yoke 132.

More particularly, notches 184 and 186 are preferably formed in the outer surfaces 148 and 150, respectively, of the respective arms 128 and 130 to define respective shoulders 188 and 190. The catches 176 and 178 of the respective legs 170 and 172 are received in respective ones of the notches 184 and 186 and engage respective ones of the shoulders 188 and 190. Furthermore, the yoke 132 includes an end surface 192 that is engaged by the retention members 180 and 182 of the bight 174. Thus, in a preferred embodiment, the legs 170 and 172 apply pressure against the outer surfaces 148 and 150 of the arms 128 and 130 such that movement of the arms 128 and 130 away from each other and from the yoke 132 is restricted, while the retention members 180 and 182 of the bight 174 apply pressure to the end surface 192 of the yoke 132 such that movement of the yoke 132 relative to the arms 128 and 130 in a direction at least substantially orthogonal to the end surface 192 is restricted. That is, the lateral projections 152 and 154 are retained against corresponding ones of the first shelves 160 and 162, and the vertical projections 156 and 158 are retained against corresponding ones of the second shelves 164 and 166.

Accidental removal of the clip 168 is at least substantially prevented by the provision of pressure against the arms 128 and 130 provided by the clip 168 itself, as well as by the engagement of the catches 176 and 178 of the legs 170 and 172 in the notches 184 and 186 and against the corresponding shoulders 188 and 190 formed in the arms 128 and 130.

In addition to the yoke 132 that, as described above, preferably extends between the arms 128 and 130 adjacent the respective bases 134 and 136, the stator 38 preferably includes a bridge 194 that spans the gap 142 between the tips 138 and 140. The bridge 194 will be discussed in greater detail below.

Even further, each of the arms 128 and 130 preferably includes an intermediate projection 196 or 198, respectively, that extends inwardly from each arm 128 or 130 toward the other arm 128 or 130. Preferably, each of the intermediate projections 196 and 198 originates from an intermediate region between the respective base and tip 134 and 138 or base and tip 136 and 140 of the respective arm 128 or 130.

The inner surfaces 144 and 146 of the respective arms 128 and 130 preferably face each other and define an opening 200 between the bases 134 and 136 and tips 138 and 140. The opening 200 preferably includes a rotor-receiving region 202 and a wire-receiving region 204. Preferably, the yoke 132, the arms 128 and 130, and the intermediate projections 196 and 198 at least in part define the wire-receiving region 204 of the opening 200. Furthermore, the bridge 194, the arms 128 and 130, and the intermediate projections 196 and 198 preferably at least in part define the rotor-receiving region 202 of the opening 200.

The wire-receiving region 204 is preferably at least substantially rectangular in vertical cross-section, while the rotor-receiving opening is preferably at least substantially circular in vertical cross-section.

Preferably, a pair of wire bobbins 206 and 208 are received on respective ones of the arms 128 and 130 so as to be located at least in part within the wire-receiving region 204. Wire 44 is wound around each of the bobbins 206 and 208 to form the respective pluralities of coils 124 and 126. The wire 44 may be of any electrically conductive type, although copper or aluminum is preferred.

As will be discussed in greater detail below, provision of a removably retained yoke 132 is highly advantageous when assembling that stator 38 and, more particularly, when winding the bobbins 206 and 208.

In addition to the components discussed above, the stator 38 preferably includes an inner pole 210 extending inwardly from the bridge 194 and a search coil 212 adjacent the bridge 194. More preferably, the search coil 212 least substantially encircles the inner pole 210. After assembly of the pump assembly 10, the rotor-receiving region 202 and the rotor 36 itself are preferably positioned adjacent the inner pole 210 and the search coil 212.

More particularly, in a preferred embodiment, the bridge 194 includes a pair of spaced apart walls 214 and 216 extending outwardly from the tips 138 and 140, respectively, and a platform 218 extending between and interconnecting the walls 214 and 216. The inner pole 210 preferably extends inwardly from the platform 218, and the search coil 212 preferably circumscribes the inner pole 210 and rests on the platform 218.

The bridge 194 has a deleterious effect on flux that flows through the stator 38 during operation, so much so that the core 42 might suitably be referred to as a "short-circuited C." However, as will be discussed further below, some aspects of the present invention are operable to at least in part mitigate this undesirable effect.

As best shown in FIGS. 13 and 14, the search coil 212 preferably includes wiring 220 wound about a bobbin 222 to form a plurality of coils 224. The bobbin 222 preferably includes a pair of tabs 226 and 228 having respective catches 230 and 232 that additionally retain the bobbin 222 in position relative to the platform 218.

The bobbin 222 preferably comprises a non-electrically conductive material such as plastic, although any one more of a variety of materials may suitably be used.

Preferably, the walls 214 and 216 of the bridge 194 are substantially parallel and extend along a common direction. Preferably, the common direction is the same as that along which the arms 128 and 130 extend. That is, the walls 214 and 216 and the arms 128 and 130 are preferably mutually parallel to one another. The platform 218 is preferably generally perpendicular to this common direction so as to be perpendicular to the walls 214 and 216 and the arms 128 and 130.

The bridge 194 is preferably integral with the arms 128 and 130, although a non-integral configuration is permissible. The bridge 194 could be attached to the arms 128 and 130 using latches or adhesives, for instance, or by any one or more other connection means or mechanisms known in the art.

Similarly, the inner pole 210 is preferably integral with the platform 218 but could be attached to the platform 218 using any one or more connection means or mechanisms known in the art.

For assembly of the preferred embodiment, the bobbins 206 and 208 are wound with the wire 44 to form the coils 124 and 126. The wound bobbins 206 and 208 are then placed on respective ones of the arms 128 and 130. The yoke 132 is placed between the arms so that the projections 152, 154, 156, and 158 rest on corresponding ones of the shelves 160, 162, 164, and 166; and the clip 168 is placed over the yoke 132 and the arms 128 and 130 so as to retain the arms 128 and 130 in contact with the yoke 132.

For disassembly, the clip 168 may be removed to allow subsequent removal of the yoke 132 and, if required, the coils and bobbins 124,206 and/or 126,208.

Such an assembly and disassembly method is highly advantageous due to its general ease of implementation and lack of required specialized equipment. Conventional multi-component stators such as those using press-fit dovetailed laminations, for instance, require an assembly press and must be manufactured to tight tolerances to ensure proper stator segment interconnection is possible. The dies required for formation of the laminations must therefore not only be highly accurate but also be frequently replaced or otherwise maintained to ensure precision punching. Other conventional methods of assembly, some of which use rivets, ball and socket joints, and/or welding are also problematic, with disassembly for maintenance or replacement of a component (e.g., a bad coil) being time-consuming and destructive.

In broad terms, in operation of a preferred embodiment, electrical current flowing through the coils 124 and 126 energizes the stator 38 and results in rotation of the rotor 36 due to interaction of the magnetized stator core 42 with the magnet 40 of the rotor 36.

With particular regard to start-up of the motor, however, it is important that the position of the rotor 36 be sensed so that the coils 124 and 126 can be appropriately energized to optimize start-up. While such sensing might conventionally be done using, for instance, a Hall sensor, the present invention utilizes the search coil 212 encircling the inner pole 210. More particularly, the search coil 212 is operable to detect voltage and, in turn, variations in flux. The search coil 212 is therefore operable to detect rotation of the rotor 36 and, in turn, the position of the rotor 36. This positional info may then be relayed to a controller (not shown) that will then signal the appropriate energization of the main coils 124 and 126 for optimal start-up of the motor 12 and, in turn, the pump 14.

The inner pole 210 allows a greater flux coupling to the main coils 124 and 126 so as to in part offset the deleterious effects of flux loss in the bridge 194. Furthermore, provision of the inner pole 210 reduces cogging and ensures that a greater amount of flux is provided to the search coil 212 than might otherwise be directed thereto. The greater amount of flux reduces the effects of noise and allows a stronger signal to be read.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A stator for use in a motor, said stator comprising:
a core,
said core including a pair of spaced apart arms that define an opening and a removable yoke that spans the opening;
wiring wound around at least one of the arms; and
a resiliently flexible clip removably retained on the core,
said clip being resiliently flexed when retained on the core so as to apply pressure against each arm toward the yoke such that the arms are retained in contact with the yoke,
each of said arms cooperating with the yoke to define an interface along which the arm and the yoke are configured to engage one another,
said interface including a plurality of sections that are angularly offset relative to one another so as to define a plurality of steps,
said sections being orthogonally oriented relative to one another,
each of said arms including a pair of offset, generally parallel shelves and a pair of offset, generally parallel walls extending generally orthogonally relative to the shelves,
said yoke including a pair of inwardly extending yoke projections and a pair of outwardly extending yoke projections extending generally orthogonally relative to the inwardly extending yoke projections,
each of said inwardly extending and outwardly extending yoke projections presenting a complemental shelf-engaging surface for engaging a corresponding one of the shelves,
each of said inwardly extending and outwardly extending yoke projections presenting a complemental wall-engaging surface extending generally orthogonally relative to the shelf-engaging surfaces for engaging a corresponding one of the walls,
said shelves, said shelf-engaging surfaces, said walls, and said wall-engaging surfaces cooperatively defining the interface.

2. The stator as claimed in claim 1,
said yoke including an end surface,
each of said arms presenting an outer surface,
said clip engaging the end surface and the outer surfaces.

3. The stator as claimed in claim 2,
said clip including a pair of spaced apart legs, each of which engages and applies pressure against a respective one of the outer surfaces such that movement of the arms away from each other and from the yoke is restricted.

4. The stator as claimed in claim 3,
each of said legs including a catch engaging the respective one of the arms.

5. The stator as claimed in claim 4,
each of said arms including a notch that defines a shoulder,
each of said catches being received in the respective one of the notches and engaging the respective one of the notches.

6. The stator as claimed in claim 3,
said clip including a bight extending between and interconnecting the legs,
said bight including a pair of retention members that engage and apply pressure to the end surface of the yoke such that movement of the yoke relative to the arms in a direction at least substantially orthogonal to the end surface is restricted.

7. The stator as claimed in claim 6,
each of said retention members being a flexibly deformable spring element that is resiliently flexed when the clip is retained on the core.

8. The stator as claimed in claim 1,
said yoke including a first pair of projections,
each of said arms including a first shelf,
each of said first projections being configured to abut a corresponding first shelf,
each of said first projections and the corresponding first shelf cooperatively at least in part defining a first one of said steps.

9. The stator as claimed in claim 8,
said yoke including a second pair of projections,
each of said arms including a second shelf,
each of said second projections being configured to abut a corresponding second shelf,
each of said second projections and the corresponding second shelf cooperatively at least in part defining a second one of said steps.

10. The stator as claimed in claim 9,
said second pair of projections extending at least substantially orthogonally relative to the first pair of projections.

11. The stator as claimed in claim 1,
said stator further comprising at least one bobbin configured to be placed on at least one of the arms prior to placement of the yoke across the opening,
said wiring being wound around the at least one bobbin.

12. The stator as claimed in claim 1,
each of said arms presenting opposite ends,
said core being generally C-shaped, with the yoke extending between the arms adjacent common ends thereof.

13. The stator as claimed in claim 12,
each of said arms presenting inner and outer surfaces, with the inner surfaces facing one another and defining therebetween the opening,
said yoke extending between and interconnecting the inner surfaces.

14. The stator as claimed in claim 13,
said clip being generally U-shaped and extending along the yoke, around the ends of the arms, and into engagement with the outer surfaces.

15. The stator as claimed in claim 1,
said shelves and said walls facing inwardly.

16. A motor for use in a machine, said motor comprising:
a rotor rotatable about an axis; and
a stator, said stator including—
a core,
said core including a pair of spaced apart arms that define an opening and a removable yoke that spans the opening, wiring wound around at least one of the arms, and
a resiliently flexible clip removably retained on the core,
said clip being resiliently flexed when retained on the core so as to apply pressure against each arm toward the yoke such that the arms are retained in contact with the yoke,
each of said arms cooperating with the yoke to define an interface along which the arm and the yoke are configured to engage one another,
said interface including a plurality of sections that are angularly offset relative to one another so as to define a plurality of steps,
said sections being orthogonally oriented relative to one another,
each of said arms including a pair of offset, generally parallel shelves and a pair of offset, generally parallel walls extending generally orthogonally relative to the shelves,
said yoke including a pair of inwardly extending yoke projections and a pair of outwardly extending yoke projections extending generally orthogonally relative to the inwardly extending yoke projections,
each of said inwardly extending and outwardly extending yoke projections presenting a complemental shelf-engaging surface for engaging a corresponding one of the shelves,
each of said inwardly extending and outwardly extending yoke projections presenting a complemental wall-engaging surface extending generally orthogonally relative to the shelf-engaging surfaces for engaging a corresponding one of the walls,
said shelves, said shelf-engaging surfaces, said walls, and said wall-engaging surfaces cooperatively defining the interface.

17. The motor as claimed in claim 16,
said yoke including an end surface,
each of said arms presenting an outer surface,
said clip engaging the end surface and the outer surfaces.

18. The motor as claimed in claim 17,
said clip including a pair of spaced apart legs, each of which engages and applies pressure against a respective one of the outer surfaces such that movement of the arms away from each other and from the yoke is restricted.

19. The motor as claimed in claim 18,
each of said legs including a catch engaging the respective one of the arms.

20. The motor as claimed in claim 19,
each of said arms including a notch that defines a shoulder,
each of said catches being received in the respective one of the notches and engaging the respective one of the notches.

21. The motor as claimed in claim 18,
said clip including a bight extending between and interconnecting the legs,
said bight including a pair of retention members that engage and apply pressure to the end surface of the yoke such that movement of the yoke relative to the arms in a direction at least substantially orthogonal to the end surface is restricted.

22. The motor as claimed in claim 21,
each of said retention members being a flexibly deformable spring element that is resiliently flexed when the clip is retained on the core.

23. The motor as claimed in claim 16,
said yoke including a first pair of projections,
each of said arms including a first shelf,
each of said first projections being configured to abut a corresponding first shelf,
each of said first projections and the corresponding first shelf cooperatively at least in part defining a first one of said steps.

24. The motor as claimed in claim 23,
said yoke including a second pair of projections,
each of said arms including a second shelf,
each of said second projections being configured to abut a corresponding second shelf,
each of said second projections and the corresponding second shelf cooperatively at least in part defining a second one of said steps.

25. The motor as claimed in claim 24,
said second pair of projections extending at least substantially orthogonally relative to the first pair of projections.

26. The motor as claimed in claim 16,
said stator further comprising at least one bobbin configured to be placed on at least one of the arms prior to placement of the yoke across the opening,
said wiring being wound around the at least one bobbin.

27. The motor as claimed in claim 16,
each of said arms presenting opposite ends,
said core being generally C-shaped, with the yoke extending between the arms adjacent common ends thereof.

28. The stator as claimed in claim 27,
each of said arms presenting inner and outer surfaces, with the inner surfaces facing one another and defining therebetween the opening,
said yoke extending between and interconnecting the inner surfaces.

29. The stator as claimed in claim 28,
said clip being generally U-shaped and extending along the yoke, around the ends of the arms, and into engagement with the outer surfaces.

30. The motor as claimed in claim 16,
said shelves and said walls facing inwardly.

* * * * *